United States Patent
Kasík et al.

(10) Patent No.: US 11,934,908 B2
(45) Date of Patent: Mar. 19, 2024

(54) DEVICE FOR DETECTION OF A SIGNAL OF PASSIVE CHIPS AND METHOD FOR OPERATING THE DEVICE

(71) Applicant: Y Soft Corporation, Brno (CZ)

(72) Inventors: Vladislav Kasík, Prague (CZ); Pavel Staněk, Prague (CZ)

(73) Assignee: Y Soft Corporation, Brno (CZ)

( * ) Notice: Subject to any disclaimer, the term of this patent is extended or adjusted under 35 U.S.C. 154(b) by 182 days.

(21) Appl. No.: 17/640,036

(22) PCT Filed: Sep. 3, 2020

(86) PCT No.: PCT/CZ2020/050063
§ 371 (c)(1),
(2) Date: Mar. 3, 2022

(87) PCT Pub. No.: WO2021/043347
PCT Pub. Date: Mar. 11, 2021

(65) Prior Publication Data
US 2022/0318530 A1    Oct. 6, 2022

(30) Foreign Application Priority Data
Sep. 3, 2019   (CZ) ................ CZ2019-562

(51) Int. Cl.
*G06K 7/10*     (2006.01)
(52) U.S. Cl.
CPC ..... *G06K 7/10366* (2013.01); *G06K 7/10316* (2013.01)
(58) Field of Classification Search
CPC ................ G06K 7/10366; G06K 7/10316
(Continued)

(56) References Cited

U.S. PATENT DOCUMENTS

| | | | | |
|---|---|---|---|---|
| 5,311,552 A | * | 5/1994 | Chennakeshu | ....... H03M 13/25 329/304 |
| 5,952,935 A | | 9/1999 | Mejia et al. | |

(Continued)

FOREIGN PATENT DOCUMENTS

| | | |
|---|---|---|
| CN | 102930237 A | 2/2013 |
| EP | 1244997 B1 | 3/2006 |
| WO | 2002052485 A1 | 7/2002 |

OTHER PUBLICATIONS

European Patent Office, International Search Report dated Dec. 16, 2020.

(Continued)

*Primary Examiner* — Kerri L McNally
*Assistant Examiner* — Thang D Tran
(74) *Attorney, Agent, or Firm* — Thedford I. Hitaffer; Hitaffer & Hitaffer, PLLC

(57) ABSTRACT

A device for detection of a signal of passive RFID chips comprises an antenna for transmitting a source radio signal and receiving a RFID chip radio signal. A signal processed by a peak detector is fed to an input of first and second parallel branches. An output of these branches is connected to a computing unit. The first and second branches each comprise a filter and a bit decoder. The filter and bit decoder of the first and second branches each processes a signal modulated by first and second types of modulation. The computing unit comprises at least first and second modules connected in parallel comprising a protocol for detection of a signal processed by the protocol, wherein the first and second module protocols are different.

10 Claims, 3 Drawing Sheets

(58) Field of Classification Search
USPC .................................................... 340/10.4
See application file for complete search history.

(56) References Cited

U.S. PATENT DOCUMENTS

| | | | | |
|---|---|---|---|---|
| 6,009,120 | A * | 12/1999 | Nobakht | H04L 1/0045 375/232 |
| 6,264,106 | B1 * | 7/2001 | Bridgelall | G06K 7/0004 235/462.46 |
| 7,990,249 | B1 * | 8/2011 | Hyde | G06K 19/07749 340/12.36 |
| 11,797,792 | B2 * | 10/2023 | Kasík | G06K 7/10366 |
| 2007/0080810 | A1 * | 4/2007 | Juds | G08B 13/24 340/572.8 |
| 2011/0006900 | A1 * | 1/2011 | Nyffeler | G06K 19/0723 340/572.1 |
| 2011/0304439 | A1 * | 12/2011 | Panchalan | G06K 7/10297 340/10.3 |
| 2012/0001731 | A1 * | 1/2012 | Potyrailo | A61M 39/18 340/10.1 |
| 2013/0112725 | A1 * | 5/2013 | Luo | G07G 1/009 224/539 |
| 2013/0207786 | A1 * | 8/2013 | Hutzler | G06V 40/70 235/492 |
| 2014/0110484 | A1 * | 4/2014 | Balachandran | G06K 7/01 235/439 |
| 2014/0141799 | A1 * | 5/2014 | Rousu | G01S 19/235 455/456.1 |
| 2014/0240099 | A1 * | 8/2014 | Chuang | G06K 19/0703 340/10.5 |
| 2015/0177348 | A1 * | 6/2015 | Peng | G01R 33/4828 324/309 |
| 2017/0310513 | A1 * | 10/2017 | Manku | H04B 5/0056 |
| 2018/0096238 | A1 * | 4/2018 | Buller | G06Q 20/3278 |
| 2020/0304160 | A1 * | 9/2020 | Hoang | H04B 1/04 |
| 2021/0342559 | A1 * | 11/2021 | Frederick | G06K 7/0008 |
| 2022/0300724 | A1 * | 9/2022 | Kasík | H03F 3/195 |

OTHER PUBLICATIONS

European Patent Office, Written Opinion dated Dec. 16, 2020.
European Patent Office, International Preliminary Report on Patentability dated Jan. 5, 2022.

* cited by examiner

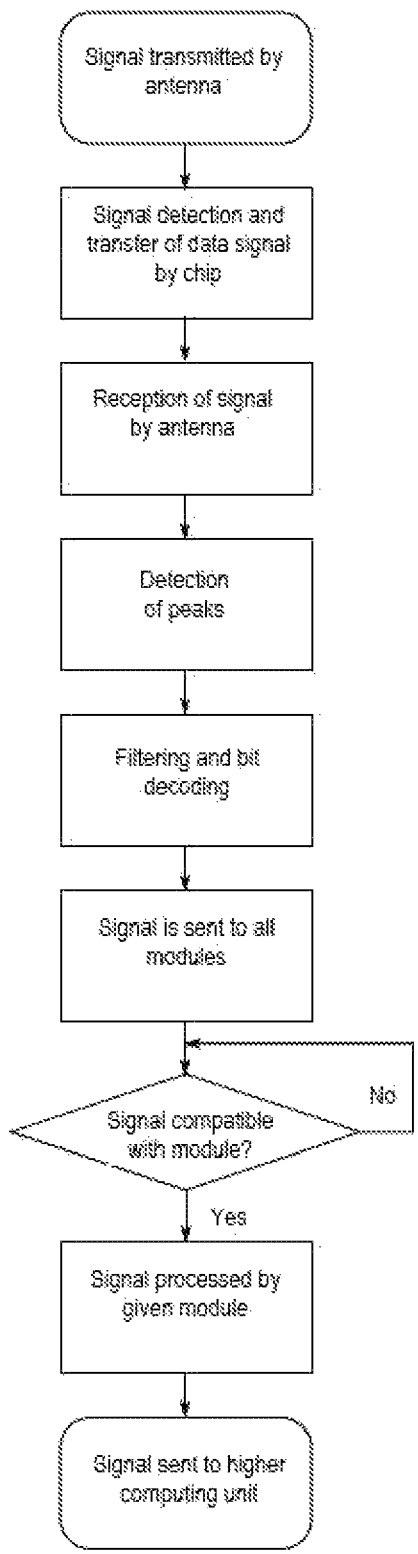
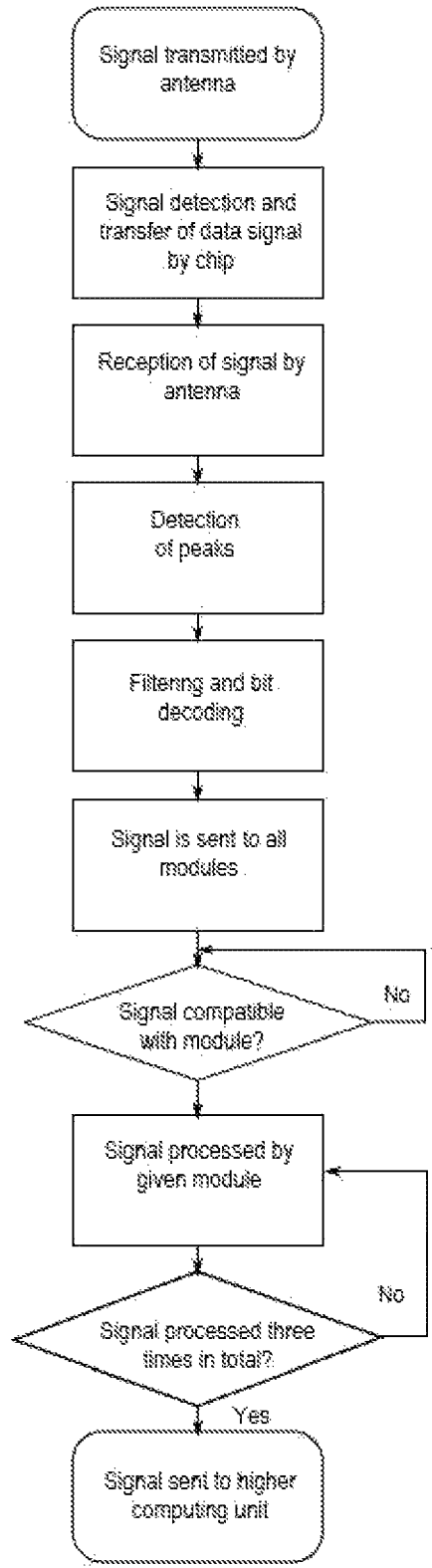
Fig. 3                    Fig. 4

DEVICE FOR DETECTION OF A SIGNAL OF PASSIVE CHIPS AND METHOD FOR OPERATING THE DEVICE

CROSS-REFERENCE TO RELATED APPLICATIONS

This application, filed under 35 USC 371, is a United States National Stage Application of International Application No. PCT/CZ2020/050063, filed Sep. 3, 2020, which claims priority to CZ Application No. PV 2019-562, filed on Sep. 3, 2019, the disclosures of which are incorporated herein by reference in their entirety.

FIELD OF THE INVENTION

The invention relates to a device for detection of a signal of passive chips working on the basis of contactless reading in radio spectrum, particularly for RFID.

BACKGROUND OF THE INVENTION

Systems working on the basis of radio frequency signals, also known as Radio Frequency Identification, RFID, have recently been widely used for identification of goods, people, animals, etc. Systems of this type comprise a reader and a chip, which is used as an identification element. Chips are active or passive. In the latter case this chip does not have its own electric power source. Then the electric power source is a transmitter, which can be a reader or a sensor. It emits to its immediate surroundings electromagnetic radiation with the frequency ranging exactly in the radio frequency, often e.g., 125 kHz or 13.56 MHz, via an antenna. Subsequently, the passive RFID chip uses this radiation energy, which powers its internal circuit, often tuned to the emitted radiation frequency. The RFID chip itself then starts emitting a signal including some significant information—e.g., an identification code of the chip owner. Subsequently, this signal is received by the antenna of the reading device, filtered, demodulated, and further processed to obtain relevant information from it.

The information in the given signal is digitally transferred in a binary form. The signal is then modulated so that the binary transmittable information is distinguished. The basic types of digital modulations are: ASK, also known as Amplitude-Shift Keying, when the signal amplitude change corresponds to another binary form, FSK, also known as Frequency-Shift Keying, when the signal frequency change corresponds to another binary form, and PSK, also known as Phase-Shift Keying, when the signal phase change corresponds to another binary form.

In addition, the information itself may be coded in some way in the modulated signal, therefore, for its extraction from the signal it is necessary not only to demodulate the signal, but also to decode it. Furthermore, the whole signal includes a number of control and supplementary bits. For example, there may be a starting sequence of bits before the sequence of bits corresponding to the transferred information. Furthermore, the transferred data are complemented with parity bits, which are used to detect errors in the transferred signal, or facilitate its control. Thus, it is necessary to distinguish the transmitted information in the form of a bitstream from other bits. The starting sequences of bits may vary in different chips, e.g., it may be a sequence of nine 1 bits. The length of the bit sequence of the transferred information may also vary in different chips.

Taking into account coding, modulation type, signal frequency, signal length and supplementary bits, it is apparent that there may be tens of various chip types. It is possible to use a higher number of readers, each of which is adapted to process a signal of a certain combination type of the above-mentioned properties. Nevertheless, the versatility of this solution is minimal and may bring considerable amount of confusion when working with this system. The current state of the art fails to present a technical solution that would effectively deal with this issue.

A partial solution of the issue is presented by, for example, a patent document WO 2002 52485 Improved identification reader. This document discloses a reader comprising PSK and FSK decoders connected in parallel in the reader circuit. The outputs of these decoders are then fed to the microprocessor input, where they are further processed. The reader further comprises several other branches designed for a different signal processing. However, this device allows working only with differently modulated signals, it fails in the case of a different coding, signal length or shape.

Another device that allows detection and reading of differently modulated signals is disclosed in a patent document CN 102930237 A. However, mutual arrangement of the components of the assembly is not clear in this document.

Another device that allows detection and reading of differently modulated signals with different frequency is disclosed by e.g., an expired U.S. Pat. No. 5,952,935. However, different coding and shape of signals are not recognizable by this device. Furthermore, this device comprises a number of filters connected in series. In this case the serial connection reduces the efficiency of signal processing, since the signal must pass through all filters before it is efficiently processed.

Another solution discloses an RFID chip reader. The reader is equipped with a number of units that make reading of several chips simultaneously possible. However, the solution of complication which occurs when using chips with different properties is not disclosed.

The background of the invention shows that no device that allows fast and high-quality processing of RFID chip signals with different properties is available.

SUMMARY OF THE INVENTION

The above mentioned shortcomings are to some extent eliminated by a device for detection of signals of passive RFID chips. The device for detection of signals of passive RFID chips comprises an antenna for transmitting electromagnetic radiation and receiving a radio signal of RFID chips, a peak detector for detection of peaks in the signal received by the antenna, filters and bit decoders adapted to filtering and decoding of different types of signal modulation from sets of amplitude, frequency and phase modulations. The device further comprises a computing unit. The device for detection of a signal of passive RFID chips comprises at least a first and a second parallel branch, where the signal processed by the peak detector is fed to the input of these branches, and the output of these branches is fed to the computing unit. The first and the second branch each comprise a filter connected in series with a bit decoder. The filter and the decoder of the first branch are adapted to process the signal modulated by the first type of modulation. The filter and the decoder of the second branch are adapted to process the signal modulated by the second type of modulation, wherein the first type of modulation is different from the second type of modulation. The computing unit comprises at least a first and a second module connected in parallel. The modules are adapted to search the decoded signals for signal properties of a pre-defined protocol for detection of signal processed by the given protocol. The first module protocol is different from the second module protocol. Such device allows fast and effective processing of signals of RFID chips of different protocols due to the parallel connection of branches and individual modules. The individual modules are further adapted to detect the initial bit sequence and the overall length of bit sequence of the received radio signal entering the computing unit. This advantage brings further possibilities for signal processing. In another preferred embodiment, the individual modules are equipped with a timer unit. It is used for checking the signal bitrate and thus brings additional signal processing options.

Another embodiment of the invention further includes the use of a higher computing unit to which signal processed in the computing unit is sent. The signal is further processed in the higher computing unit.

In a preferred embodiment the device comprises a third branch connected in parallel to the first and the second branch. The third branch filter and bit decoder are adapted to process the signal modulated by the third type of modulation, different from the first and the second type of modulation in the first and the second branch. The advantage of this embodiment lies in the possibility to process three different types of signal modulation of the passive RFID chip.

Preferred embodiments of the invention then include at least one branch with the filter and the bit decoder adapted to filter and decode modulation of the RFID chip signal, and further at least one module with the protocol is compatible with the RFID chip signal protocol.

The method of the use of the device is as follows. RFID chip signal is received by the antenna. This signal received by the peak detector is subsequently fed to all branches where it is subsequently processed. The processed signal is further fed to the computing unit and at the same time processed by all modules. The output signal of the computing unit is further fed to the higher computing unit and further processed.

If the module timer unit detects that bitrate is incompatible with the given modules, the signal is no longer processed. This reduces the computation demands of the whole process.

In a preferred embodiment the signal in the module is checked at least twice. This ensures double-check of the data and higher accuracy of the whole process.

DESCRIPTION OF DRAWINGS

The subject of the invention is further shown by exemplary embodiments, which are described by means of the of attached drawings, where:

FIG. 3—is a flow chart describing how the device is operated.

FIG. 4—is a flow chart representing another exemplary method of the operation of the given device.

EXEMPLARY EMBODIMENTS OF THE INVENTION

The invention will be further described by exemplary embodiments with reference to the corresponding drawings. The invention is not limited to the below mentioned embodiments.

Figure 1:
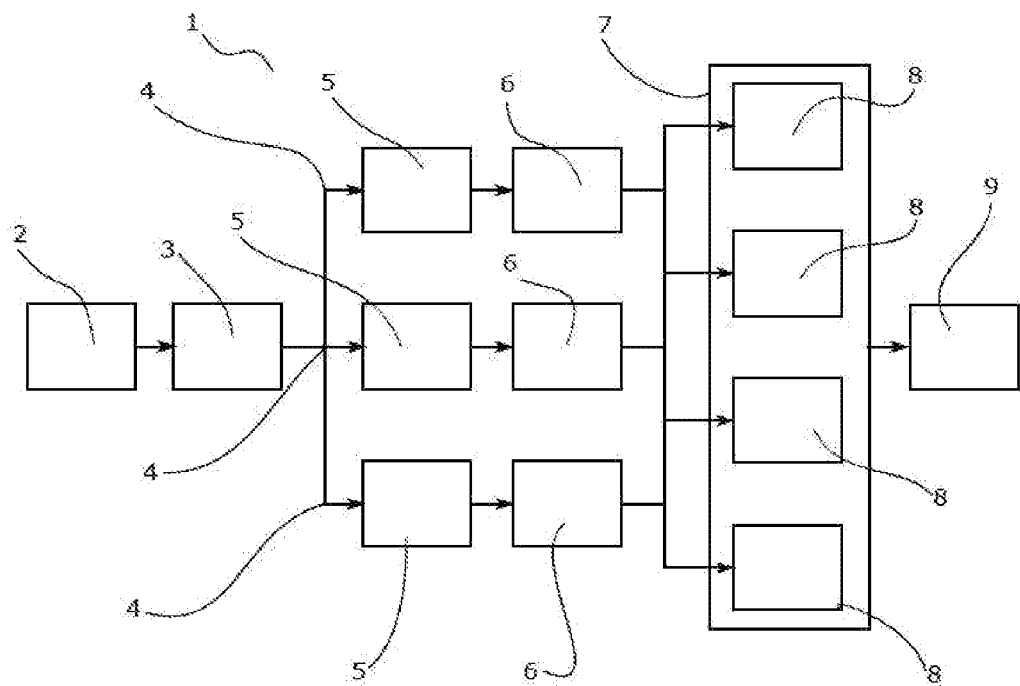
FIG. 1—shows a schematic representation of an arrangement of individual components of the device for detection of a signal of passive RFID chips. In this embodiment the device comprises an antenna, a peak detector, three branches comprising a filter and a bit decoder, and a computing unit comprising a number of modules. The computing unit output is further processed by a higher computing unit.

In an exemplary embodiment of the invention according to FIG. 1 a device 1 for detection of a signal of passive RFID chips comprises an antenna 2 for transmitting and receiving radio signal, a peak detector 3 for detection of peaks in the signal received by the antenna 2, filters 5 and bit decoders 6 adapted to filter and decode amplitude, frequency and/or phase modulated signals, and a computing unit 7. These components are mutually electrically connected as shown in FIG. 1. In an exemplary embodiment the device 1 for detection of the signal of passive RFID chips comprises at least two parallel branches 4, each of the branches 4 comprises a filter 5 and a bit decoder 6. The output of the peak detector 3 is fed to the input of each branch 4. This input signal is filtered by the filter 5 of the given branch 4 and subsequently processed by the bit decoder 6 of the given branch 4. Subsequently, the processed signal is fed from the given branch 4 to the input of the computing unit 7. In an exemplary embodiment of the invention the computing unit 7 comprises at least two parallel and different modules 8, wherein each module 8 is adapted to detect pre-defined protocols in the processed signal. The difference of the individual modules 8 means that each of them is set primarily to a different type of signal, or transferred bitstream, in terms of its modulation, coding, length, shape and length of the initial bit sequence, bitrate, frequency, number and type of control bits. In other words, each module 8 is compatible with a different type of signal protocol transmitted by the RFID chip. Exemplary embodiments are not limited to these properties or protocols of the signal, or of the transferred bitstream. Thus, the individual modules 8 of the computing unit 7 may differ even with respect to the other properties of the given signal. In an exemplary embodiment of the invention the individual modules 8 may further comprise a timer unit. The timer unit is used for checking the bitrate of the demodulated signal. The computing unit 7 further comprises at least a processor and a memory.

In other exemplary embodiments of the invention the peak detector 3 may be further adapted to filter, amplify and smooth the detected signal.

In an exemplary embodiment the device further comprises the higher computing unit 9, which further processes the signal processed by the computing unit 7 or by the corresponding module 8. The higher computing unit 9 comprises at least the processor and the memory.

The individual in-parallel connected branches 4 of the device 1 for detection of the signal of passive RFID chips comprise the filter 5 and the bit decoder 6. In an exemplary embodiment of the invention the individual components (the filter 5 and the bit decoder 6) are chosen so that each branch 4 is set to a certain type of modulation of the received signal. In an exemplary embodiment when the device comprises three branches 4 in total, the first branch 4 may comprise an ASK filter and an ASK bit decoder, the second branch may comprise a FSK filter and a FSK bit decoder, and the third branch may comprise a PSK filter and a PSK bit decoder. The order, or parallel arrangement, of branches 4 is the same for all applicable combinations. Embodiments of the invention are not limited by these types of filters 5 and bit decoders 6. Thus, the branch 4 may comprise components designed for filtering and decoding signals modulated by: ASK, FSK, PSK, BPSK, QPSK and other modulation types. The invention is not limited to the use of this specific combination of filters 5, bit decoders 6 and this number of branches 4. The scope of protection provided by an independent claim includes all possible combinations of filters 5 and bit decoders 6 and the number of branches 4, which can be obtained from the above-mentioned components. However, exemplary embodiments of the invention include branches 4 connected in such way that each branch 4 is adapted to process a different type of signal.

The individual modules 8 of the computing unit 7 are further adapted to be able to read at least following information from the received signal: type of signal modulation, e.g., ASK, FSK or PSK; bitrate; type of coding, or type of coding of the initial sequence and the data themselves; shape and length of the initial sequence, length of transferred data, etc. All the information can be further considered part of a protocol searched for by the given module 8 in the processed signal.

In an exemplary embodiment of the invention the signal processed in one of the branches 4 is subsequently processed in the module 8 of the computing unit as follows, see FIG. 5. The signal is received and the timer unit checks the signal bitrate. If the bitrate is incompatible with the given module 8, the signal is not further processed in this specific module. Subsequently, the coding method of the given signal is detected, and the signal is sent for further processing by a shift register. In the signal data stream, a sequence corresponding to the initial data sequence is subsequently searched for. This sequence of bits is used for clear determination of the beginning of the transferred information in the data stream and may be represented by e.g., nine 1 bits in a row. Each module 8 comprises one sequence for which it searches in the received signal. If it fails to find this sequence, the module 8 is obviously incompatible with the given signal and the signal is not further processed in this module 8. Otherwise, the module 8 is compatible with the signal and the signal is further processed in the module 8, wherein the processed signal is stored in a buffer of the given module. Subsequently, the processed signal can be sent to the higher computing unit for further processing, or the whole process can be repeated. The signal processed in another cycle is compared with the signal processed in the first cycle. If they are identical, the whole process is apparently fine. Otherwise, the signal is incompatible with the given module, or the signal is erroneous, e.g., due to external interference or collision, when some technology can include data that are assessed as the initial sequence of different technology. This leads to the higher accuracy of data processing in the exemplary embodiment.

Figure 2:
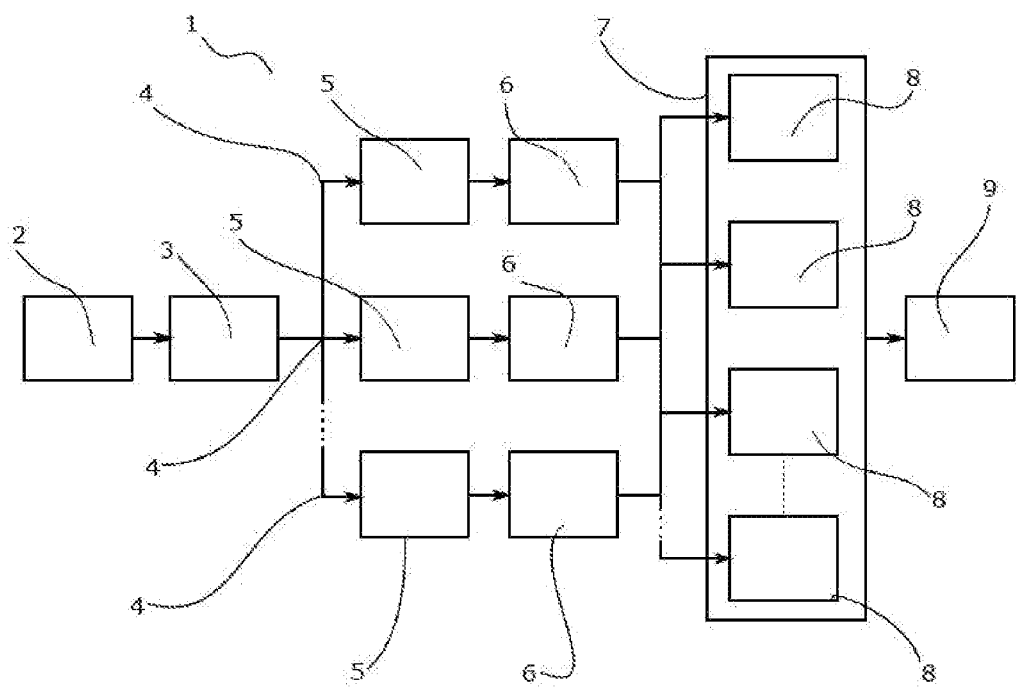
FIG. 2—shows a schematic representation of a device comprising i branches and j modules.

An exemplary embodiment shown in FIG. 1 only includes three branches 4 and four modules 8. FIG. 2 then shows another exemplary embodiment including i branches 4 and j modules 8.

Figure 5:
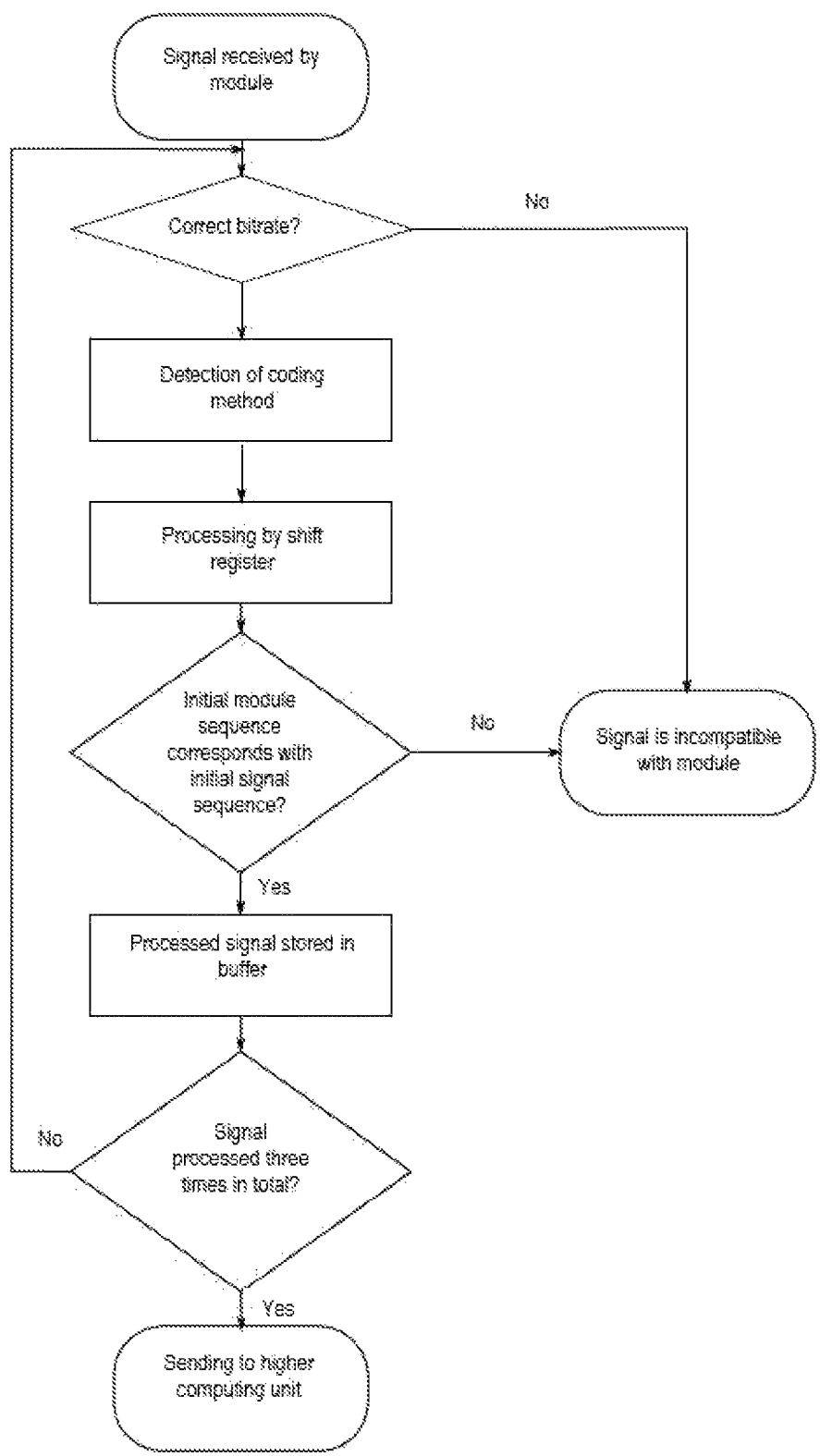
FIG. 5—is a flow chart representing the signal processing in the computing unit module.

In an exemplary embodiment the method of use of the device 1 for detection of the signal of passive RFID chips is shown in FIGS. 3-5 and is as follows. The antenna 2 of the device 1 emits continually or in pulses electromagnetic radiation with the frequency in the radio frequency spectrum, for example 125 kHz. The RFID chip itself is passive, it has no power source and as such sends no signals. As the passive RFID chip gets closer to the device 1 (the reader), the chip begins to receive the signal transmitted by the device 1 via its own antenna. Due to the induction of this electromagnetic field, it gains energy, begins to power its own internal circuit and transmit its own signal. This is subsequently detected and received by the antenna 2 of the device 1. From the antenna 2 it is further transferred to the peak detector 3, the peak detector 3 detects in this signal peaks corresponding to the transferred modulated and coded information. This processed signal is subsequently transferred to all in-parallel connected branches 4 of the device 1. This signal is subsequently processed in all branches 4, wherein each branch 4 comprises the filter 5 and the bit decoder 6, but just one branch 4 provides a further usable signal. In case the signal is amplitude modulated, it is successfully processed only in the branch 4 comprising the filter 5 and the bit decoder 6 adapted to filter and decode amplitude modulated signals. By analogy, the mentioned also applies to the other types of signal modulations, i.e., in case the signal is frequency modulated, it is successfully processed just in the branch 4 comprising the filter 5 and the bit decoder 6 adapted to filter and decode frequency modulated signals, and in case the signal is phase modulated, it is successfully processed just in the branch 4 comprising the filter 5 and the bit decoder 6 adapted to filter and decode phase modulated signals. The device 1 preferably comprises at least one branch 4, the component arrangement of which allows filtration and decoding of the signal of the read RFID chip. Subsequently, the signal processed by the given branch 4 is sent to the computing unit 7. Here it is sent to all parallel modules 8. The signal is subsequently processed in each individual module 8. Module 8 has a stored protocol therein for which it searches in the received signal. The module 8 is further adapted to detect the initial bit sequence in the bitstream, to detect the transferred coded information, modulation of the transferred signal, coding, signal length, and other signal properties. Each module has a unique combination of values of these elements, which is searched for in the given received signal. Module 8 further comprises the timer unit, which is adapted to check the bitrate of the demodulated signal. In case the bitrate checked by the timer unit is outside the modulation, the signal is not further processed. The signal is successfully processed only in one module 8, the parameters of which correspond to the parameters of the given signal. The signal processed by this module 8 is subsequently sent to the higher computing unit 9 where it is further processed. In an exemplary embodiment of the invention at least one module 8 is compatible with the signal of the passive RFID chip. Compatibility means that the signal is processed by the given module 8 without any problem. The signal is processed by the given module at least once, in the exemplary embodiment, however, the signal is processed by the module 8 three times.

The protocol in this case is understood for example as the shape and/or the form of the transferred signal. The transferred signal may have the length of the initial sequence, for example, nine bits in the form of nine 1 bits. This sequence marks the beginning of its own sequence of data bits. It can be of a different length and a different form, the individual modules 8 then have different initial sequences stored in their memory for which they search in the bitstream of the processed signal. The protocol can also include the total length of the data part of the bitstream. In the context of this invention the protocol is understood as a summary of all relevant information related to the transferred signal of the RFID passive chip.

The following example considers a RFID chip, which sends a frequency modulated signal, coded by Manchester method, initial bit sequence is given as 0x1FF (nine 1 bits in sequence) and the code includes 32 data bits, however, this example does not constitute limitations for exemplary embodiments of the invention. The RFID chip signal is detected by the antenna 2 of the device. The peak detector 3 detects peaks in this detected signal and passes such processed signal to all in-parallel connected branches 4. At the same moment this signal is processed in all branches 4. Branches 4 comprise consecutively the filter 5 and the bit decoder 6. The signal is successfully processed in the branch 4 that comprises the filter 5 and the bit decoder 6 adapted to filter and decode frequency modulated signals. In other branches 4 which comprise components adapted to process the signal of different modulations, the signal is not successfully processed. After being processed by the particular branch 4 the signal is further sent to the computing unit 7. In the computing unit 7 the signal is sent to all individual modules 8 at the same time and processed simultaneously. The signal is successfully processed only in the module 8 which corresponds by its setting to the initial sequence of bits 0x1FF, Manchester type coding, and to the length of the data sequence of 32 bits, and it is sent to the higher computing unit. In an exemplary embodiment the processing by the given module 8 is repeated three times in total.

The disclosed method and device are not limited only to analog signal processing, they can also be applied to digital signal processing. In this exemplary embodiment it is possible to digitally integrate all blocks into a single processor. Thus, the processor according to this exemplary embodiment comprises integrated number of modules 8, which comprise a protocol that is subsequently searched for in the received signal. The protocol means a protocol comprising similar information as the protocols described above. The module 8 integrated in the processor further comprises the timer unit adapted to check the bitrate of the demodulated signal. The module 8 itself, or the protocol of the given module 8, also comprises bit sequences of different lengths and shapes which correspond to the different lengths and shapes of the initial bit sequences of the transferred signal. At least one module 8, or the protocol of the given module 8, is then compatible with the received signal. The method of signal processing in this exemplary embodiment of the invention corresponds with the above-mentioned signal processing methods. However, it is not limiting in terms of protection of the present solution. The scope of protection is given by patent claims.

In an exemplary embodiment the device 1 can be a part of a system designed for printing, e.g., in an office. The access to printing is usually limited, when every user may have a card containing an RFID chip for activation of a given printer. The printer can be frequently shared by more companies and the access granted to tens of people. It can be complicated to ensure that all people with an access have an RFID chip working on the same protocol. The device 1 must be adapted to read all these protocols as fast as possible. In this case the printer can thus comprise the device 1 for detection of the signal of passive RFID chips (a reader). The reader in this embodiment is further able to communicate with a remote server, which stores for example data on persons using the given printer, and, for example, authorization of these persons to use the given printer. Every person using the printer has their own RFID chip, e.g., in a portable card, to be used for the activation of the printer. In an exemplary embodiment a person places the RFID chip on the printer reader, waits for the signal of the passive RFID chip to be processed by the device 1 and then the printing or another action is performed.

INDUSTRIAL APPLICABILITY

The device according to this invention can be used for readers of passive RFID chips, particularly for readers that often work with signals of different types and properties. It can be used particularly as a component of printers which can be used only after presentation of an identification card operating on the RFID basis.

LIST OF REFERENCE SIGNS

1—device for detection of a signal of passive RFID chips
2—antenna
3—peak detector
4—branch
5—filter
6—bit decoder
7—computing unit
8—module
9—higher computing unit

The invention claimed is:

1. A device for detection of a signal of passive RFID chips comprising an antenna for transmission of a source radio signal and receiving a radio signal of RFID chips, a peak detector for detection of peaks in the signal received by the antenna, filters and bit decoders filter and decode signals with different types of modulation from a group including amplitude, frequency and phase modulation, and a computing unit, the device further comprises at least a first and a second parallel branch, wherein each of the first and the second branches comprise a said filter connected in series with a said bit decoder, wherein the filter and the bit decoder of the first branch process the signal modulated by a first type of modulation, the filter and the bit decoder of the second branch process the signal modulated by a second type of modulation, wherein the signal processed by the peak detector is fed to an input of these branches and an output of these branches is fed to the computing unit, wherein the first type of modulation is different from the second type of modulation, wherein the computing unit comprises at least a first and a second module connected in parallel, the first module being operable to search the decoded signals for signal properties of a first protocol, the second module being operable to search the decoded signals for signal properties of a second protocol different from the first module protocol, wherein the protocols are pre-defined and based on results of the searches the computing unit detects a protocol of the received radio signal, the signal properties comprising at least an initial bit sequence and a total length of the bit sequence of a signal provided to the computing unit.

2. The device for detection of the signal of passive RFID chips according to claim 1, wherein individual modules are provided with a timer unit to check a bitrate of the decoded signal.

3. The device for detection of the signal of passive RFID chips according to claim 1, further comprising a higher computing unit to process the signal processed by the computing unit.

4. The device for detection of the signal of passive RFID chips according to claim 1, further comprising a third branch connected in parallel to the first and the second branch, wherein the filter and the bit decoder of the third branch to process the signal modulated by a third type of modulation, wherein the third type of modulation is different from the first and the second type of modulation.

5. The device for detection of the signal of passive RFID chips according to claim 1, wherein at least one branch comprises the filter and the bit decoder filter and decode the signal of the RFID chip.

6. The device for detection of the signal of passive RFID chips according to claim 1, wherein at least one module is compatible with the processed signal.

7. A method of use of the device for detection of the signal of passive RFID chips including steps of:
   a) providing a device for detection of a signal of passive RFID chips comprising an antenna for transmission of a source radio signal and receiving a radio signal of RFID chips, a peak detector for detection of peaks in the signal received by the antenna, filters and bit decoders filter and decode signals with different types of modulation from a group including amplitude, frequency and phase modulation, and a computing unit, the device further comprises at least a first and a second parallel branch, wherein each of the first and the second branches comprise a said filter connected in series with a said bit decoder, wherein the filter and the bit decoder of the first branch process the signal modulated by a first type of modulation, the filter and the bit decoder of the second branch process the signal modulated by a second type of modulation, wherein the signal processed by the peak detector is fed to an input of these branches and an output of these branches is fed to the computing unit, wherein the first type of modulation is different from the second type of modulation, wherein the computing unit comprises at least a first and a second module connected in parallel, the first module being operable to search the decoded signals for signal properties of a first protocol, the second module being operable to search the decoded signals for signal properties of a second protocol different from the first module protocol, wherein the protocols are pre-defined and based on results of the searches the computing unit detects a protocol of the received radio signal, the signal properties comprising at least an initial bit sequence and a total length of the bit sequence of a signal provided to the computing unit;
   b) receiving the signal of passive RFID chip by the antenna; and
   c) detecting the peaks in the signal and obtaining a modulated signal by the peak detector and processing of the signal by a reader, wherein the modulated signal is further simultaneously fed to all branches, where the modulated signal is subsequently processed, the processed signal is further fed to the computing unit and at the same time processed by all modules, wherein an output signal of the computing unit is further fed to a higher computing unit and further processed.

8. The method of use of the device for detection of the signal of passive RFID chips according to claim 7, wherein the processing of the signal by the module is performed by comparing the signal protocol of the RFID chip and the protocol of the given module, wherein if the signal protocol of the RFID chip and the protocol of the given module are not identical, the signal is not further processed by this module.

9. The method of use of the device for detection of the signal of passive RFID chips according to claim 7, wherein if bitrate checked by a timer unit is incompatible with the given module, the signal is not further processed.

10. The method of use of the device for detection of the signal of passive RFID chips according to claim 7, wherein the signal is checked at least twice in each module.

\* \* \* \* \*